United States Patent
Johnson et al.

(10) Patent No.: US 10,054,476 B2
(45) Date of Patent: Aug. 21, 2018

(54) FLOATLESS PULSED WAVE GUIDE LIQUID LEVEL MEASUREMENT

(71) Applicant: LITTELFUSE, INC., Chicago, IL (US)

(72) Inventors: Brian Johnson, Saltash (GB); Efrem Fesshaie, Norwich (GB); Rimantas Misevicius, Kaunas (LT)

(73) Assignee: LITTELFUSE, INC., Chicago, IL (US)

( * ) Notice: Subject to any disclaimer, the term of this patent is extended or adjusted under 35 U.S.C. 154(b) by 251 days.

(21) Appl. No.: 14/792,685

(22) Filed: Jul. 7, 2015

(65) Prior Publication Data
US 2016/0003664 A1    Jan. 7, 2016

Related U.S. Application Data

(60) Provisional application No. 62/021,336, filed on Jul. 7, 2014.

(51) Int. Cl.
*G01R 27/28*    (2006.01)
*G01F 23/284*   (2006.01)

(52) U.S. Cl.
CPC .................. *G01F 23/284* (2013.01)

(58) Field of Classification Search
CPC .... G01F 23/284; G01F 23/2845; G01F 23/26; G01F 23/28; G01D 5/202; G01D 5/485; G01D 5/48; G01D 5/12; G01D 5/20; G01R 27/04; G01R 27/06; G01N 22/04; G01N 33/246

USPC ....... 324/649, 644, 643, 622, 640, 533, 534; 73/304 C, 314, 866, 290 R, 304 R
See application file for complete search history.

(56) References Cited

U.S. PATENT DOCUMENTS

| | | | | |
|---|---|---|---|---|
| 5,717,337 A | * | 2/1998 | Kelly | G01F 23/26 324/533 |
| 5,819,582 A | * | 10/1998 | Kelly | G01F 23/2845 73/290 R |
| 6,018,247 A | * | 1/2000 | Kelly | G01D 5/202 324/643 |
| 6,644,114 B1 | * | 11/2003 | McEwan | G01F 23/284 73/290 R |
| 7,634,945 B2 | * | 12/2009 | Champion | G01F 23/284 73/291 |
| 8,525,527 B2 | * | 9/2013 | Skaling | G01N 33/24 324/642 |
| 2011/0228640 A1 | * | 9/2011 | Holcomb | G01F 23/2963 367/99 |

* cited by examiner

*Primary Examiner* — Thang Le

(57) ABSTRACT

A waveguide arrangement may include a tank defining a chamber for holding a liquid; and a pulsed waveguide (PWG) disposed at least partially within the chamber, the PWG comprising: an inner cylinder, the inner cylinder being grounded. The waveguide may also include an electrically conductive coil wrapped around the inner cylinder, wherein the pulsed waveguide is arranged to generate a first delay between a first initial pulse and a first reflected pulse when an upper surface of the liquid is at a first level, and to generate a second delay between a second initial pulse and a second reflected pulse when the upper surface of the liquid is a second level.

13 Claims, 6 Drawing Sheets

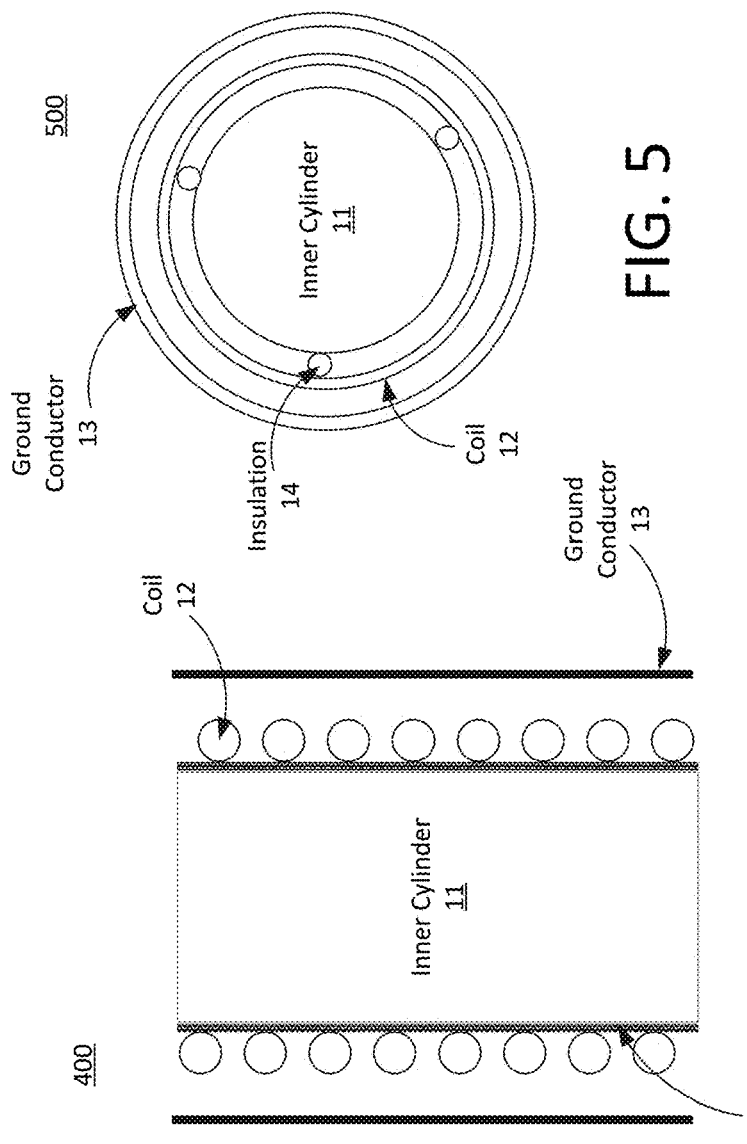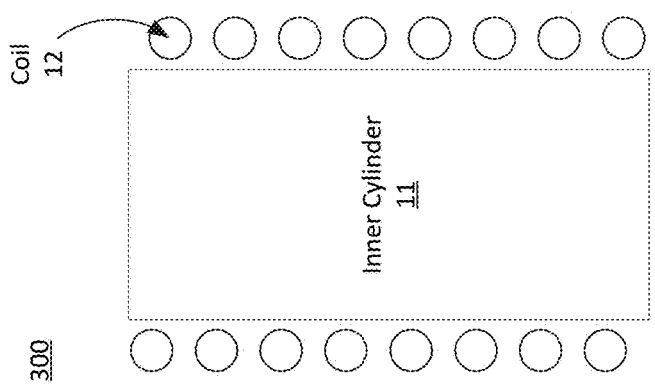

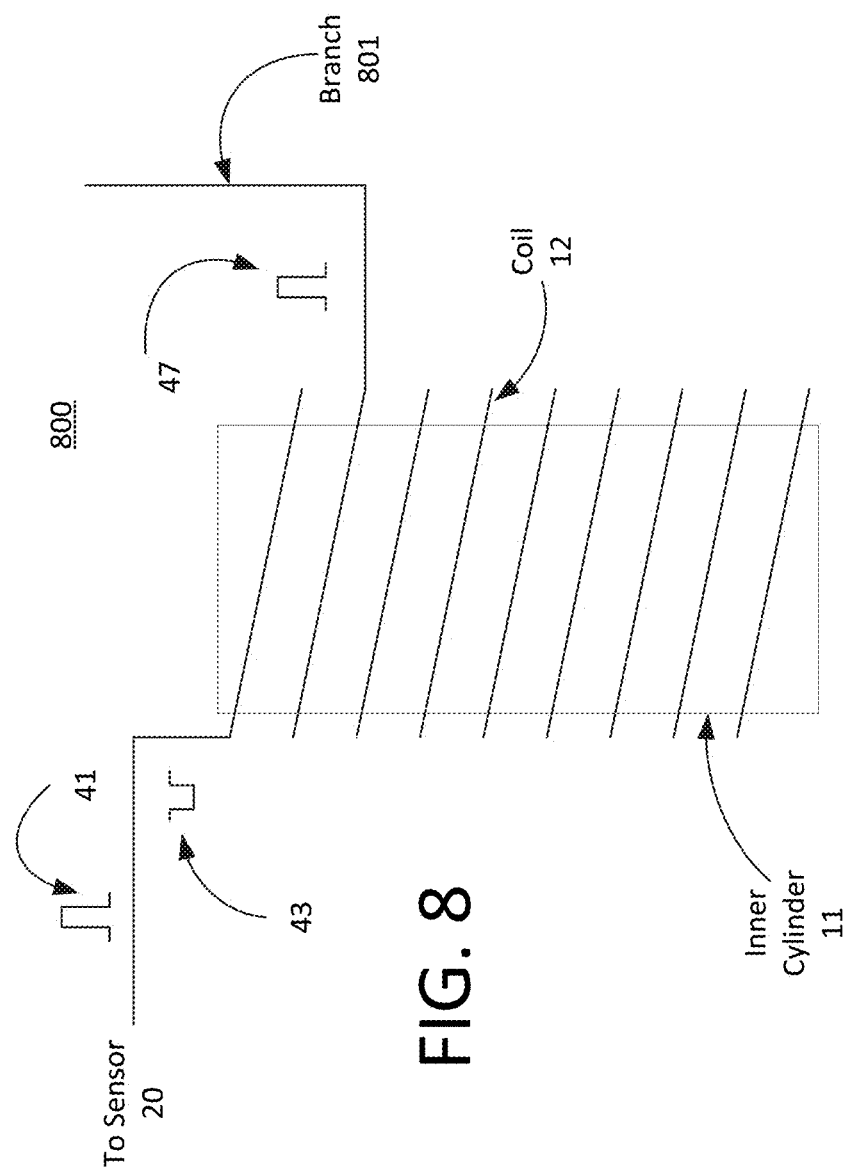

FLOATLESS PULSED WAVE GUIDE LIQUID LEVEL MEASUREMENT

RELATED APPLICATIONS

This application claims priority to U.S. provisional patent application No. 62/021,336, filed Jul. 7, 2014 and incorporated by reference herein in its entirety.

FIELD OF THE EMBODIMENTS

Embodiments of the present disclosure relate generally to waveguide based liquid level sensors and more particularly to floatless pulsed waveguide liquid level sensors.

GENERAL BACKGROUND

Knowing the level of liquid in a tank is useful to a variety of applications. For example, urea-based solutions are often used in automotive application to reduce emissions. In particular, diesel powered motor vehicles include a urea tank, separate from the fuel tank, which is used to carry an operating fluid such as an automotive urea solution, or the like. The urea solution is stored in the urea tank and is sprayed into the exhaust gases of the vehicle in order to convert oxides of nitrogen into elementary nitrogen and water. Accordingly, the harmful emissions of the vehicle are reduced. As will be appreciated, various countries in the world have regulated that some vehicles include urea based emissions systems in order to comply with emissions standards. These systems are sometimes referred to as Selective Catalytic Reduction (SCR) systems or SCR vehicles.

Accordingly, determining the level of urea in the tank is useful to ensure that adequate urea exists for proper operation of the SCR system. Urea is extremely corrosive; as such, providing continuous linear level measurement float type liquid level sensors for use with urea is challenging. Another approach to liquid level measurement attempts to measure the level of liquid based on the change in measured capacitance between probes immersed in the liquid. Such liquid level sensors may entail complex detection and sensing electronics. Furthermore, often tanks have non-uniform shape designed to fit in available space, posing further challenges for detection methods.

It is with respect to the above that the present disclosure is provided.

SUMMARY

Various embodiments of the present disclosure provide a liquid level sensing system. In one embodiment, a waveguide arrangement may include a tank defining a chamber for holding a liquid; and pulsed waveguide (PWG) disposed at least partially within the chamber. The PWG may include an inner cylinder the, inner cylinder being grounded; an electrically conductive coil wrapped around the inner cylinder, wherein the pulsed waveguide is arranged to generate a first delay between a first initial pulse and a first reflected pulse when an upper surface of the liquid is at a first level, and to generated a second delay between a second initial pulse and a second reflected pulse when the upper surface of the liquid is a second level.

In another embodiment, a level sensing system configured to measure the level of a liquid may include a tank for holding the liquid; a pulsed waveguide (PWG) disposed at least partially within the tank, the PWG having an inner cylinder, inner cylinder being grounded, and an electrically conductive coil wrapped about the inner cylinder; and an electronics module configured to transmit an initial pulse to the PWG and receive a reflected pulse from the PWG, wherein the reflection is caused by either (i) a change in impedance or permittivity between the liquid and an adjacent medium or (ii) a low impedance path to ground.

In a further embodiment, a method of sensing a level of a liquid may include disposing a pulsed waveguide (PWG) in a tank containing the liquid, the PWG comprising an electrically conductive coil wrapped around an inner cylinder, the inner cylinder being grounded; transmitting an initial pulse to the liquid via a portion of the electrically conductive coil disposed in an ambient outside the liquid; and receiving a reflected pulse generated when the initial pulse in the electrically conductive coil reaches an interface between the ambient and liquid, wherein a delay between the initial pulse and reflected pulse is indicative of the level of the liquid.

BRIEF DESCRIPTION OF THE DRAWINGS

FIGS. 3-5 show examples of a PWG of the system of FIG. 1;

FIG. 8 shows an example of a PWG of the system of FIG. 1; and

FIG. 9A shows an example of a PWG of the system of FIG. 1 while

DESCRIPTION OF EMBODIMENTS

Figure 1:
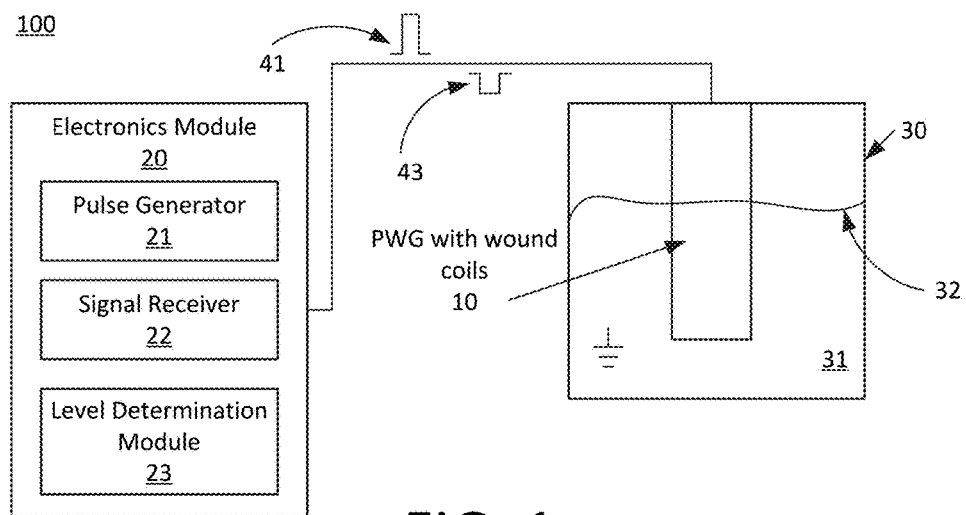
FIG. 1 shows a system for measuring a liquid level surface including a PWG having a coil wrapped around an inner cylinder.

Example embodiments will now be described more fully hereinafter with reference to the accompanying drawings, where some embodiments are shown. The present disclosure may be embodied in many different forms and should not be construed as limited to the examples set forth herein. These examples are provided so that this disclosure will be thorough and complete, and will fully convey the scope of the claims to those skilled in the art. In the drawings, like numbers refer to like elements throughout.

In general, the present disclosure provides a liquid level sensor including a pulsed waveguide (PWG) with a conductive element wound in a coil constructed from a plurality of windings wound about an inner cylinder. In some examples, the PWG includes a ground conductor disposed adjacent to the coil. The PWG is immersed in a liquid and a pulse is transmitted to the PWG, wherein the pulse travels along the coil as a wave. When the wave encounters the surface or "level" of the liquid, a reflection of the wave is created and transmitted back up the coil. The "level" of the liquid then can be determined based on the timing between the initial pulse and the reflected pulse.

It is worthy to note that the PWG sensors described herein are configured to operate while not using a float. That is, the level of a liquid can be determined as described above while not using a float disposed in the liquid. In particular, the change in medium (e.g., between air and the liquid surface, or the like) creates a reflection that returns back up the wound coil. Furthermore, the present disclosure may be implemented to measure the level of a variety of different liquids. Although examples herein discuss measuring the level of urea, this is done for convenience and clarity and is not intended to be limiting.

Additionally, at least one specific advantage of the present disclosure is the use of wound coils about an inner cylinder in the PWG. In particular, the wound coils provide that the time between an initial pulse and a reflected pulse is significantly slowed. As such, simpler and more cost efficient electronics can be employed to generate the initial voltage pulse, detect the reflected pulse, and determine the liquid level.

FIG. 1 illustrates a block diagram of a level sensing system, shown as system 100, arranged in accordance with at least some embodiments of the present disclosure. The system 100 includes a PWG 10 having a wound coil (e.g., refer to FIGS. 3-7) and a electronics module 20. The PWG 10 is disposed in a tank 30 having a liquid 31 whose level (e.g., the liquid surface 32) is to be measured by the system 100. In various embodiments, the liquid 31 may be grounded.

Figure 2:
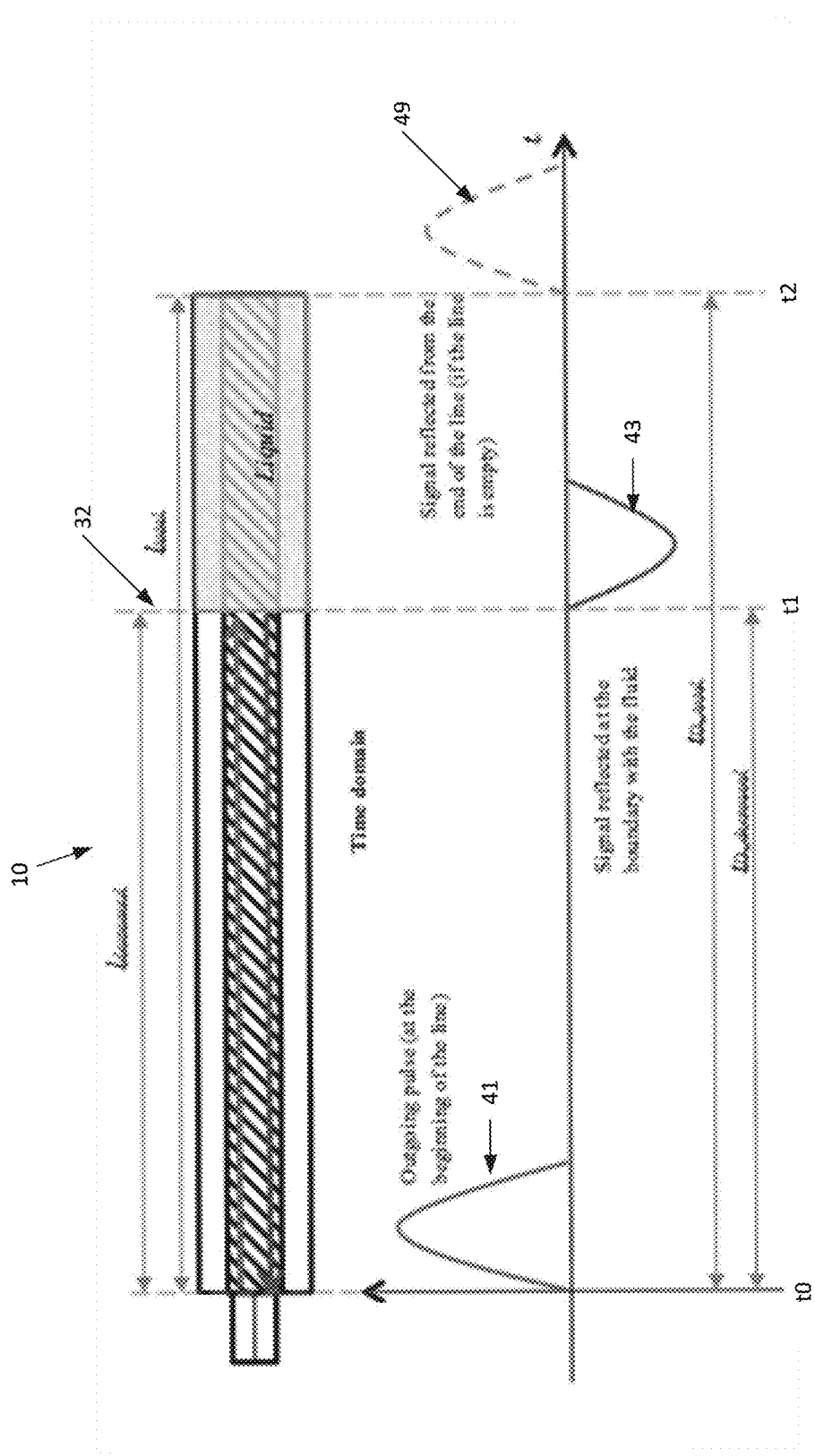
FIG. 2 shows a timing diagram associated with the level sensing system of FIG. 1.

In general, the electronics module 20 has a pulse generator 21 configured to transmit an initial pulse 41 to the PWG 10 and a signal receiver 22 configured to receive a reflected pulse 43 back from the PWG 10. The electronics module 20 is further configured to determine the liquid surface 32 based on the timing between the initial pulse 41 and the reflected pulse 43. For example, FIG. 2 illustrates the initial pulse 41 and the reflected pulse 43 in the time domain. In particular, this figure shows the initial pulse 41 entering the PWG 10 at time t0. The reflected pulse 43 is created at the liquid surface 32 at time t1. The difference between time t0 and time t1, which may be considered a delay between the initial pulse 41 and reflected pulse 43, is represented as td-decreased. In one example a delay between 10 ns and 200 ns may be conveniently measured for a distance of 10 mm to 200 mm. Additionally, an additional reflection, referred to as an empty tank (empty-tank) reflection 49 is shown, which reflection may be created at time t2 by a reflection from the end of the waveguide (e.g., a terminal end of the wound coils, meaning an end disposed away from an end of the wound coils where the initial pulse 41 is received). This reflection may be created where the liquid level is empty. As depicted, the polarity of the reflected pulse 43 is different than the initial pulse 41. As will be appreciated, this is due to the fact that the reflected pulse is caused by a short between the coil 12 and the liquid 31, when the liquid 31 is grounded, for example. Furthermore, the polarity of the empty tank reflection 49 may be the same as the polarity of the initial pulse 41, while different than the polarity of the reflected pulse 43. This distinction is useful to determine a certain signature of an empty tank, where the empty tank reflection 49 is generated when the tank 30 is empty. In particular the empty tank reflection 49 may be generated when a terminal end of the coil 12 has a high impedance path to ground. An example of a high impedance path to ground is where a terminal end of the coil is open, not electrically connected to ground. Another example of a high impedance path to ground is where the terminal end of the coil 12 is coupled to ground via a resistor or circuit that imparts a higher resistance between the terminal end and ground as compared to resistance in the rest of the coil 12.

In various embodiments, the liquid level may be determined from measured characteristics of the transmission line such as group velocity. Furthermore group velocity may be measured across different operating temperatures and may be stored in electronics module 20. In this manner, the liquid level may be determined by a simple equation where a given distance is a product of (Time×velocity). For example the liquid level may be determined by TD×Vg, where $T_D$ is the measured delay and $V_G$ the group velocity of the transmission line.

The level determination module 23 may include a processor, memory, and associated signal detection components, analog to digital converters, or the like arranged to determine the time td-decreased (e.g., from the time t0 and t1) and to determine the level of liquid surface 32 from the time td-decreased (e.g., by application of the equations described above). Further examples of position determination based on timing of reflected waves as described herein are detailed in U.S. Patent Application Publication No. 20140306721 entitled "PROPAGATION VELOCITY COMPENSATED POSITION MEASUREMENT SENSOR," based upon U.S. patent application Ser. No. 14/250,087, filed Apr. 10, 2014, which application is incorporated entirely herein by reference.

Figure 6:
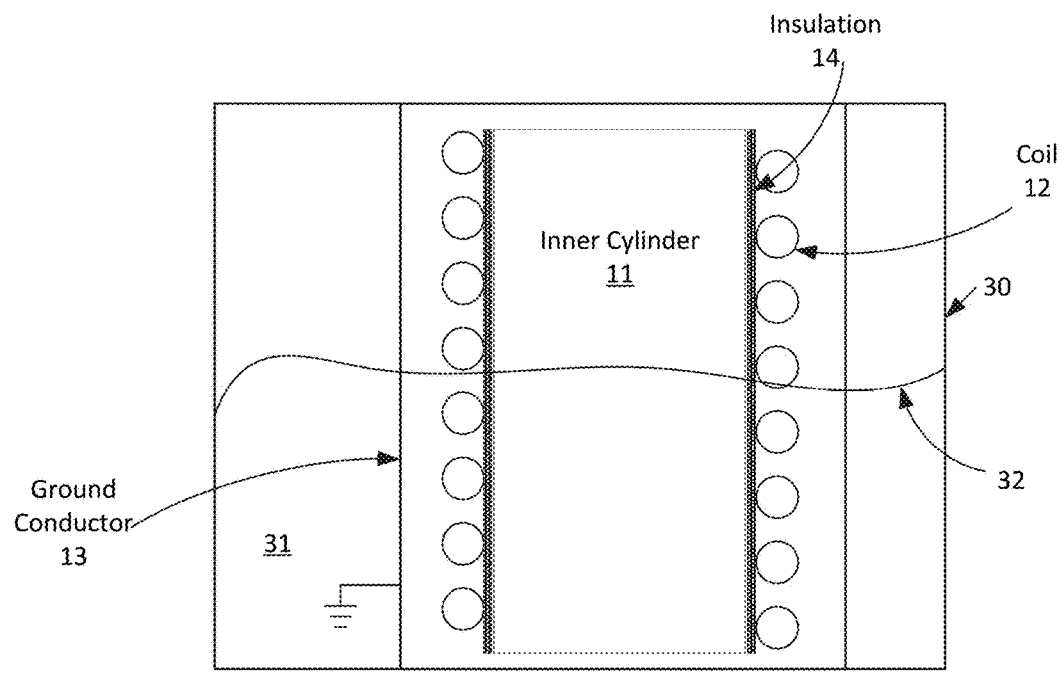
FIGS. 6-7 show example implementations of a PWG in a tank in greater detail.
Figure 7:
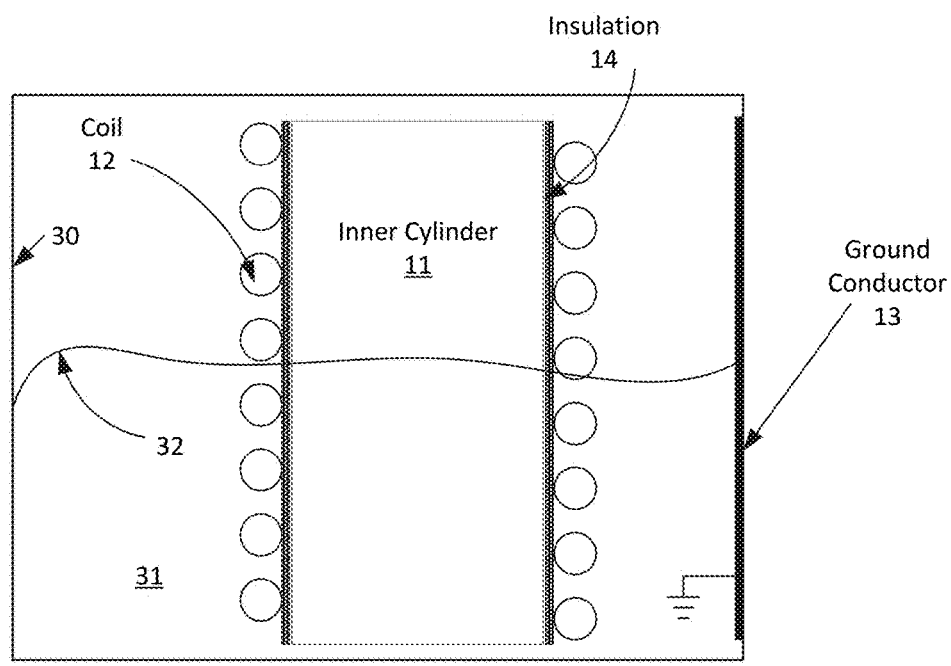

As indicated above, the PWG 10 includes coils wound about an inner cylinder. Examples of the PWG 10 are shown in FIGS. 3-9. In particular, FIGS. 3-5 and 8-9 show examples of the PWG 10 while FIGS. 6-7 shows examples of the PWG 10 inserted into the tank 30.

Turning more specifically to FIG. 3, a cross-sectional view of a PWG 300 is shown. The PWG 300 may be implemented in the system 100 as the PWG 10. As depicted, the PWG 300 includes an inner cylinder 11 and a coil 12 wound about the inner cylinder 11, where the coil 12 is electrically conductive. In various embodiments, the inner cylinder 11 may be grounded. As can be seen, the windings of coil 12 are spaced apart from the inner cylinder 11. The inner cylinder 11 can be any of a variety of geometric shapes. Although referred to herein as a cylinder, this description is not intended to be limiting, and the inner cylinder 11 may be planar, square tube, or the like.

During operation, the PWG 300 may be implemented to measure the liquid surface 32 based on a reflected wave caused by a change in the dielectric characteristics, the permittivity, or the like between the liquid 31 and the air in the tank.

Returning to FIG. 1, in accordance with various embodiments, a pulsed waveguide, such as PWG 10 or PWG 300 may be arranged vertically within the tank 30, meaning that the axis of the inner cylinder 11 may extend along a generally vertical direction while the liquid surface 32 of the liquid 31 extends generally along a horizontal direction. As shown in FIG. 3, the coil 12 is wrapped around the inner cylinder 11 in a manner that defines a coil axis that extends along the cylinder axis of inner cylinder 11. Accordingly, as a level of the liquid surface 32 changes, the coil 12 is oriented so greater or fewer numbers of turns or windings of the coil 12 are disposed outside of the liquid 31. In this manner, because the number of windings disposed outside the liquid 31 changes with liquid level, the pulsed waveguide such as PWG 300 is arranged to generate a first delay between a first initial pulse and a first reflected pulse when an upper surface (liquid surface 32) of the liquid 31 is at a first level, and to generate a second delay between a second initial pulse and a second reflected pulse when the upper surface of the liquid is a second level.

Turning more specifically to FIG. 4, a cross-sectional view of a PWG 400 is shown. The PWG 400 may be implemented in the system 100 as the PWG 10. As depicted, the PWG 400 includes the inner cylinder 11 and the coil 12 wound about the inner cylinder 11. Furthermore, the PWG 400 includes an insulator 14, meaning an electrical insulator, disposed between the inner cylinder 11 and the coil 12. In general, the insulation 14 may be configured to space the coil 12 apart from the inner cylinder 11 as well as to electrically insulate the inner cylinder 11 from the coil 12. Additionally, the PWG 400 includes a ground conductor 13 disposed around the coil 12 and inner cylinder 11. During operation, the PWG 400 may be implemented to measure the liquid surface based on a reflected wave caused by a low impedance path to ground due to the liquid 31 being grounded by the ground conductor 13 (refer to FIGS. 6-7).

Turning more specifically to FIG. 5, a top view of a PWG 500 is shown. The PWG 500 may be implemented in the system 100 as the PWG 10. As depicted, the PWG 500 includes the inner cylinder 11, insulation 14 disposed around the inner cylinder 11, the coil 12 wound about the insulation 14 and inner cylinder 11, and the ground conductor 13 disposed about the coil 12, the insulation 14 and the inner cylinder 11. In some examples, the insulation 14 may be electrically insulating rods disposed around the inner cylinder 11 as shown. More or fewer rods than shown may be used. The rod axis of the rods may be parallel to a cylinder axis of the inner cylinder 11, for example. As described above, the insulation 14 may be configured to space the coils and electrically insulate the coils from the inner cylinder. As such, the exact configuration of the insulation can vary.

In various examples, the inner cylinder 11, the coil 12, and ground conductor 13 may be made of material resistant to corrosion by urea. For example, the inner cylinder 11, coil 12, and ground conductor 13 may be made from stainless steel.

Turning now to FIGS. 6-7, various configurations of the ground conductor are shown. In particular, FIG. 6 shows the PWG 400 disposed in the tank 30. As can be seen, the coils 12 of the PWG 400 are operably connected to the electronics module 20. In particular, the electronics module 20 is electrically connected to one end of the coil 12 to communicate voltage pulses (e.g., the initial pulse 41) to the PWG 400 and to receive reflected pulses (e.g., the reflected pulse 43) from the PWG 400. As depicted, the ground conductor 13 is a conductive cylinder (e.g., stainless steel, or the like) disposed around the coil 12. Furthermore, the ground conductor 13 is grounded. As such, the liquid is grounded. Turning now to FIG. 7, the PWG 400 is again shown disposed in the tank 30. In this case, as depicted, the ground conductor 13 is a conductive plate disposed on a wall of the tank 30 so as to be in contact with the liquid 31. The ground conductor of FIG. 6 may be implemented to provide a consistent distance between the coils 12 and the ground conductor 13. In particular, the grounded liquid creates a low impedance path for the initial pulse 41.

During operation, as voltage waves travel through the coils, when the waves encounter the liquid surface 32, the reflected pulse 43 will be created. For example, in some embodiments, the reflected pulse 43 is created due to the change in impedance caused by the grounded liquid being in contact with the coil 12 (e.g., for example using the PWG 400 or 500). As another example, in some embodiments, the reflected pulse 43 is created due to a change in the permittivity or impedance between the air and the liquid 31 (for example, using the PWG 300). In some examples, the reflected pulse 43 is created due to a change in the dielectric characteristics, permittivity, of the liquid 31. In some examples, the reflected pulse 43 is created due to a change in the permeability of the liquid 31.

FIG. 8 illustrates an example PWG, shown as the waveguide 800, which may be implemented according to various examples of the present disclosure. As depicted, the waveguide 800 includes the inner cylinder 11, the coil 12. Furthermore, a branch 801 is tapped from one of the coils a known distance from the top of the PWG. The branch 801 is an electrically conductive branch and enables a reference signal 47 to be acquired. The reference signal 47 can be used to enable ratiometric measurement of the liquid level. Such ratiometric measurements can be implemented to compensate for variations in measurement due to temperature and/or other environmental factors. In some examples, the pitch of the windings before the branch 801 can be greater or smaller than the pitch after the branch 801.

Figure 9A:
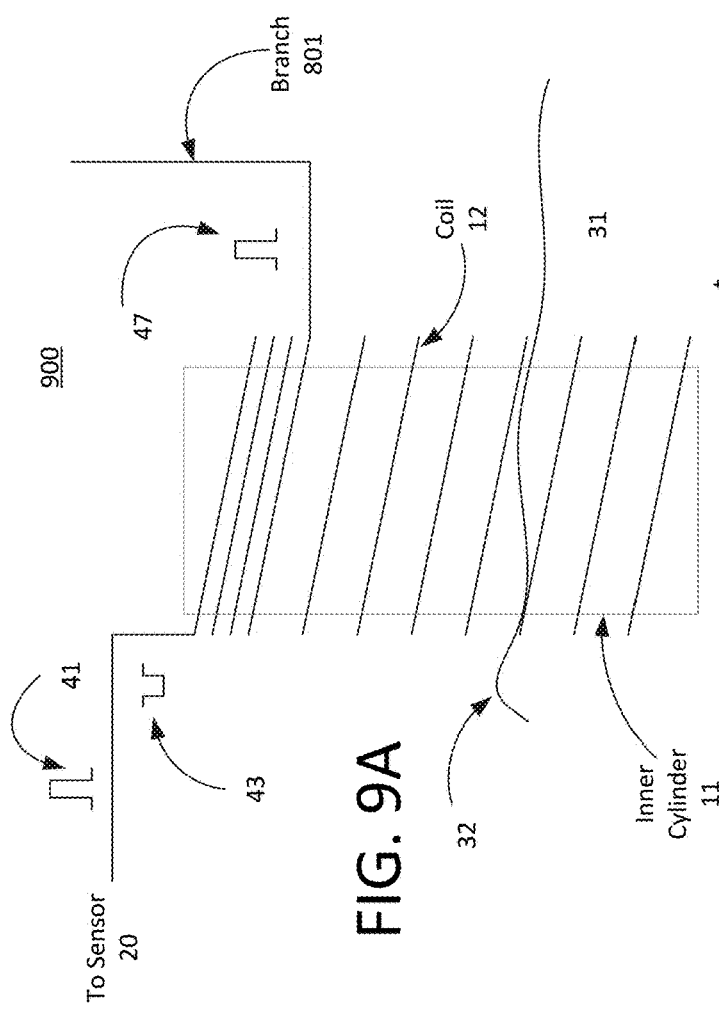
Figure 9B:
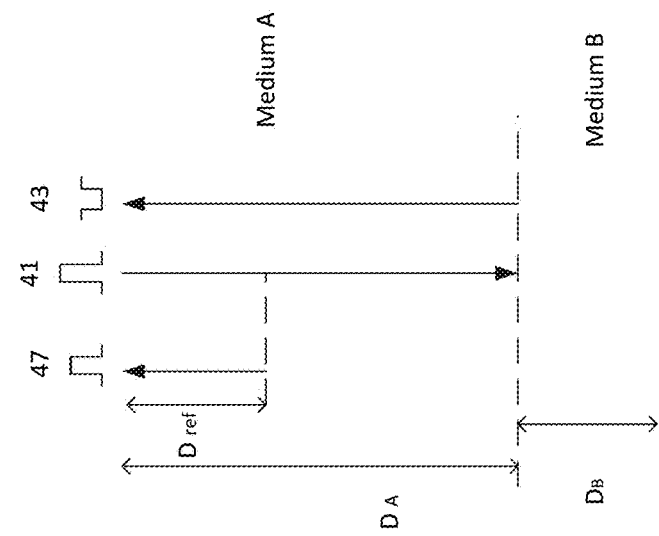
FIGS. 9B-9C show example measurement and timing diagrams for the example of FIG. 9A.
Figure 9C:
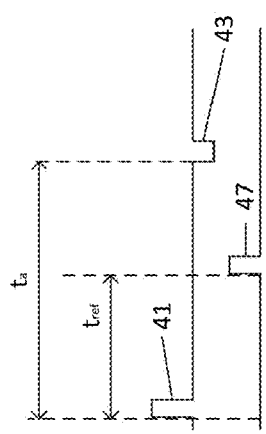

FIG. 9A illustrates a PWG, shown as waveguide 900, where the pitch of the windings before the branch 801 is greater than the pitch after the branch. This arrangement may be implemented to reduce or prevent overlap between the initial pulse 41, the reference signal 47, and the reflected pulse 43. FIGS. 9B-9C illustrate an example measurement and timing diagram corresponding to the waveguide 900 shown in FIG. 9A. As can be seen, the waveguide 900 is disposed in the liquid 31 and the liquid surface 32 of the liquid is shown. FIG. 9B shows the distances $D_A$, $D_B$, and $D_{ref}$. The distance $D_A$ corresponds to the distance between the top of the coil 12 and the liquid surface 32. The distance $D_B$ corresponds to the distance between the liquid surface 32 and the bottom of the coil 12. The distance $D_{ref}$ corresponds to the distance between the top of the coil 12 and the branch 801. FIG. 9C shows the corresponding times between the different pulses or signals. For example, the time between the initial pulse 41 and the reflected pulse 43 is shown as $t_a$ and the time between the initial pulse 41 and a ratiometric pulse, reference signal 47, is shows as $t_{ref}$.

In some examples, using a waveguide with a branch 801 (e.g., the waveguide 800 and/or 900), the liquid surface 32 may be determined based on the following. Given that $t_a * V_g = D_a$ (where Vg is the propagation velocity of a signal through the waveguide before the liquid surface 32, that is, the propagation velocity (group velocity) through medium 1 shown in FIG. 9B), $t_{ref}$ provides a reference measurement of the propagation velocity Vg. In particular, $V_g = Q * V_{ref}$, where Q is the ratio of the windings before the branch 801 to the windings after the branch 801. If the windings are the same, then Q=1 and Vg=$V_{ref}$. Accordingly, using the ratiometric signal, reference signal 47, the measurement of the distance $D_A$ can be made independent of environmental factors (e.g., temperature, or the like) that would otherwise affect the propagation velocity.

In particular a controller operably connected to the waveguide 800 and/or 900 may be configured with programming, logic, and/or features to determine the liquid level of the liquid surface 32 based on the following:

$$D_{ref} = V_{ref} t_{ref} \quad (1.1)$$

$$D_a = V_g t_a \quad (1.2)$$

$$Vg = QV_{ref} \quad (1.3)$$

From Equation 1.1 to 1.3, (1.4)

$$V_g = Q \frac{D_{ref}}{t_{ref}}$$

From Equation 1.4 and 1.2, $$D_a = Q \frac{D_{ref}}{t_{ref}} t_a.$$

Where

Q = 1, $$D_a = \frac{D_{ref}}{t_{ref}} t_a.$$

Accordingly, various float-less PWGs and example implementations have been described. In particular, PWGs having coils wrapped about an inner cylinder have been described. As noted above, as a wave travels around the coil 12, a time td-decreased between an initial pulse and a reflected pulse created by the liquid surface 32 will be greater than if simple straight conductors were used to transmit the waves. As such, detection and measurement of the time td-decreased is simplified. In particular, for liquid level measurements less than, for example, 10 meters, the overlap between the initial pulse 41 and the reflected pulse 43 is reduced. Accordingly, the electronics module 20 may be constructed of simpler and more cost efficient components than would otherwise be possible.

It is to be appreciated that the various liquid level measurement techniques and systems described above can be combined in different ways to obtain multiple measurements enabling a more accurate and robust liquid level measurement system.

While the present disclosure has been disclosed with reference to certain embodiments, numerous modifications, alterations and changes to the described embodiments are possible while not departing from the sphere and scope of the present embodiments, as defined in the appended claims. Accordingly, the following claims are not to be limited to the described embodiments, and that they be given the full scope defined by the language of the claims, and any equivalents thereof.

What is claimed is:

1. A waveguide arrangement, comprising
   a tank defining a chamber for holding a liquid; and
   a pulsed waveguide (PWG) disposed at least partially within the chamber, the PWG comprising:
   an inner cylinder, the inner cylinder being grounded;
   an electrically conductive coil wrapped around the inner cylinder, wherein the pulsed waveguide is arranged to generate a first delay between a first initial pulse and a first reflected pulse when an upper surface of the liquid is at a first level, and to generate a second delay between a second initial pulse and a second reflected pulse when the upper surface of the liquid is a second level;
   and an electronics module configured to determine a change in the level of the fluid surface based on the first delay and the second delay.

2. The waveguide arrangement of claim 1, further comprising a ground cylinder disposed around the inner cylinder.

3. The waveguide arrangement of claim 1, wherein the inner cylinder, ground cylinder, and electrically conductive coil comprise stainless steel.

4. The waveguide arrangement of claim 1, further comprising an electrical insulator disposed between the inner cylinder and electrically conductive coil.

5. The waveguide arrangement of claim 4, wherein the electrical insulator comprises a plurality of rods having a rod axis parallel to a cylinder axis of the inner cylinder.

6. The waveguide arrangement of claim 1, wherein the electrically conductive coil has a first end and a second end, the waveguide arrangement further comprising an electrically conductive branch coupled to a select winding of the electrically conductive coil between the first end and the second end, the electrically conductive branch arranged to transmit a reference signal when the first initial pulse reaches the branch.

7. The waveguide arrangement of claim 6, wherein the coil comprises:
   a first portion disposed between the first end and the electrically conductive branch, the first portion having a first pitch between adjacent windings of the first portion; and
   a second portion disposed between the electrically conductive branch and the second end, the second portion having a second pitch different than the first pitch between adjacent windings of the second portion.

8. The waveguide arrangement of claim 1, wherein a terminal end of the electrically conductive coil has a high impedance to ground, the pulsed waveguide arranged to:
   generate a reflected pulse at a liquid surface in response to a given initial pulse, wherein a polarity of the reflected pulse is different than a polarity of the initial pulse; and
   generate an empty tank reflection in response to the given initial pulse, wherein a polarity of the empty tank reflection matches the polarity of the initial pulse.

9. A level sensing system configured to measure a level of a liquid comprising:
   a tank for holding the liquid;
   a pulsed waveguide (PWG) disposed at least partially within the tank, the PWG having an inner cylinder and an electrically conductive coil wrapped about the inner cylinder; and
   an electronics module configured to transmit an initial pulse to the PWG and receive a reflected pulse from the PWG, wherein the reflection is caused by either (i) a change in impedance or permittivity between the liquid and an adjacent medium or (ii) a low impedance path to ground, wherein the electrically conductive coil has a first end and a second end, the PWG further comprising an electrically conductive branch coupled to a select winding of the electrically conductive coil between the first end and the second end, the electrically conductive branch arranged to transmit a reference signal when the initial pulse reaches the branch, wherein the electrically conductive coil comprises:
   a first portion disposed between the first end and the electrically conductive branch, the first portion having a first pitch between adjacent windings of the first portion; and
   a second portion disposed between the electrically conductive branch and the second end, the second portion having a second pitch different than the first pitch between adjacent windings of the second portion.

10. The level sensing system of claim 9, wherein the electronics module comprises a pulse generator to generate the initial pulse, a signal receiver to receive the reflected pulse, and a level determination module to determine the level of the liquid based upon a timing of the initial pulse and the reflected pulse.

11. The level sensing system of claim 9, wherein the PWG is arranged to generate a first delay between a first initial pulse and a first reflected pulse when an upper surface of the liquid is at a first level, and to generated a second delay between a second initial pulse and a second reflected pulse when the upper surface of the liquid is a second level.

12. The level sensing system of claim 9, further comprising a ground cylinder disposed around the inner cylinder, wherein the inner cylinder, ground cylinder, and electrically conductive coil comprise stainless steel.

13. The level sensing system of claim 9, further comprising an electrical insulator disposed between the inner cylinder and electrically conductive coil.

* * * * *